United States Patent
Kwak

(10) Patent No.: US 10,932,637 B2
(45) Date of Patent: Mar. 2, 2021

(54) VACUUM CLEANER AND CONTROL METHOD THEREFOR

(71) Applicant: LG ELECTRONICS INC., Seoul (KR)

(72) Inventor: Donghoon Kwak, Seoul (KR)

(73) Assignee: LG Electronics Inc., Seoul (KR)

(*) Notice: Subject to any disclaimer, the term of this patent is extended or adjusted under 35 U.S.C. 154(b) by 156 days.

(21) Appl. No.: 15/741,514

(22) PCT Filed: Jul. 1, 2016

(86) PCT No.: PCT/KR2016/007131
§ 371 (c)(1),
(2) Date: Jan. 3, 2018

(87) PCT Pub. No.: WO2017/007190
PCT Pub. Date: Jan. 12, 2017

(65) Prior Publication Data
US 2018/0213990 A1   Aug. 2, 2018

(30) Foreign Application Priority Data
Jul. 3, 2015 (KR) .................. 10-2015-0095410

(51) Int. Cl.
*A47L 9/28* (2006.01)
*A47L 9/32* (2006.01)
*G05B 15/02* (2006.01)

(52) U.S. Cl.
CPC .......... *A47L 9/2852* (2013.01); *A47L 9/2805* (2013.01); *A47L 9/325* (2013.01); *G05B 15/02* (2013.01); *G05B 2219/41336* (2013.01)

(58) Field of Classification Search
CPC ...... A47L 9/2852; A47L 9/2805; A47L 9/325; A47L 9/2842; A47L 9/2857;
(Continued)

(56) References Cited

U.S. PATENT DOCUMENTS 5,444,893 A * 8/1995 Hwang ................. A47L 5/12
15/319
5,504,971 A   4/1996 McCormick
(Continued)

FOREIGN PATENT DOCUMENTS

EP   2420170       2/2012
JP   2003-052595   2/2003
(Continued)

OTHER PUBLICATIONS

International Search Report in International Application No. PCT/KR2016/007131, dated Sep. 12, 2016, 27 pages (with English translation).
(Continued)

*Primary Examiner* — Robert J Scruggs
(74) *Attorney, Agent, or Firm* — Fish & Richardson P.C.

(57) ABSTRACT

Disclosed is a cleaner comprising a cleaner body, a handle provided in the cleaner body, a wheel provided in a lower portion of the cleaner body and rotatably supporting the cleaner body, a motor driving the wheel electrically, an encoder sensing the rotation number of the wheel or the motor, and a controller controlling the driving of the motor by varying the voltage applied to the motor based on the rotation number sensed by the encoder, wherein the controller electrically drives the wheel by applying voltage to the motor when the velocity of the cleaner body initially moving is a preset value or more, and a controlling method for the cleaner.

19 Claims, 6 Drawing Sheets

(58) Field of Classification Search
CPC ...... A47L 2201/00; A47L 9/2889; A47L 9/28; G05B 15/02; G05B 2219/41336
See application file for complete search history.

(56) References Cited

U.S. PATENT DOCUMENTS

| | | |
|---|---|---|
| 7,150,068 B1 | 12/2006 | Ragner |
| 7,389,166 B2* | 6/2008 | Harwig ................ G05D 1/0272 15/300.1 |
| 8,958,937 B2* | 2/2015 | Hillman, Jr. ........ A47L 11/4011 15/340.2 |
| 2004/0134020 A1 | 7/2004 | Conner et al. |
| 2006/0021182 A1 | 2/2006 | Kim et al. |
| 2007/0061058 A1 | 3/2007 | Gordon et al. |
| 2008/0127445 A1* | 6/2008 | Konandreas ........ A47L 11/4011 15/319 |
| 2008/0276407 A1* | 11/2008 | Schnittman ............. A47L 11/34 15/319 |
| 2010/0132149 A1 | 6/2010 | Jeong et al. |
| 2013/0025085 A1* | 1/2013 | Kim ..................... A47L 9/2857 15/319 |
| 2014/0075715 A1* | 3/2014 | MacNaughton ...... A47L 9/1691 15/347 |
| 2014/0115797 A1* | 5/2014 | Duenne ................. A47L 9/2805 15/3 |

FOREIGN PATENT DOCUMENTS

| | | |
|---|---|---|
| JP | 2006-314569 | 11/2006 |
| JP | 2009-050294 | * 3/2009 |
| KR | 20-1996-0009319 | 10/1996 |
| KR | 10-0588212 | 6/2006 |
| KR | 10-2007-0108618 | 11/2007 |
| KR | 10-0901032 | 5/2009 |
| KR | 10-1035165 | 5/2011 |

OTHER PUBLICATIONS

Taiwanese Office Action in Taiwanese Application No. 105121076, dated Jan. 18, 2018, 18 pages (with English translation).

* cited by examiner (a)

(b)

(a)

(b)

(c)

(a)

(b)

(c)

VACUUM CLEANER AND CONTROL METHOD THEREFOR

CROSS REFERENCE TO RELATED APPLICATIONS

This application is the National Phase of PCT International Application No. PCT/KR2016/007131, filed on Jul. 1, 2016, which claims priority under 35 U.S.C. 119(a) to Patent Application No. 10-2015-0095410, filed in the Republic of Korea on Jul. 3, 2015, which is hereby incorporated by reference herein in their entirety.

FIELD

Embodiments of the present disclosure relate to a cleaner for moving a cleaner body to help a user and a controlling method for the same, more particularly, to a cleaner allowing the user to move the cleaner body with easy manipulation.

BACKGROUND

A conventional cleaner is the mechanism configured to suck dust and foreign substances on a cleaning surface together with air by using the suction of a motor mounted in a cleaner body and filter the dust and foreign substances in the cleaner body.

The cleaner having such a function may be classified into an upright type cleaner and a canister type cleaner. The upright type cleaner includes a cleaner body; and a suction nozzle integrally formed with the cleaner body and functioning as a suction hole for dust and foreign substances. The canister type cleaner includes the cleaner body and the suction nozzle connected to the cleaner body via a connection pipe.

Such the upright type cleaner may include a cleaner body in which a suction motor generating a suction force is mounted; a suction nozzle sucking dust and foreign substances on a cleaning object surface into the cleaner body, using the suction force generated in the suction motor; and a handle provided on an upper surface of the cleaner body to move the suction nozzle along the cleaning object surface.

The handle is provided in an upper portion of the vacuum cleaner and the user moves the cleaner body and the suction nozzle to perform cleaning, while holding the handle. One or more wheels may be provided in the cleaner body and support the cleaner body to facilitate the movement of the cleaner body and one or more wheels may be also provided in the suction nozzle.

Accordingly, it can be said that the upright cleaner is the electric appliance which performs cleaning while the handle, the cleaner body and the suction nozzle are moved by the user together.

The canister type cleaner is the type of the cleaner of which a cleaner body having a suction motor and a dust collecting tank is connected with a handle and a suction nozzle via an extended pipe.

Specifically, once the suction motor is put into operation after the electric power is applied to the cleaner body, the suction force is generated and the air containing dust and foreign substances put on the cleaning object surface is sucked into the suction nozzle by such the suction force.

The air containing dust, and foreign substances is drawn into the cleaner body and the dust and foreign substances are separated from the air by the cyclone principle in a dust collector mounted in the cleaner body.

The separated dust and foreign substances are collected in the dust collector and the air having them separated there from is exhausted outside the cleaner body via an air outlet hole.

Such the conventional cleaner is movable only by the user's force. In case the friction of the cleaning object surface is high or the load of the cleaner is large while the user is moving and using the cleaner, the conventional cleaner has the disadvantage of user's fatigue.

DETAILED DESCRIPTION OF THE INVENTION

Technical Problem

Accordingly, the present invention is provided to address the above-noted and other problems.

Embodiments of the present disclosure provide a cleaner which may facilitate a user's manipulation related to movement of the cleaner and a controlling method for the same.

Embodiments of the present disclosure also provide a cleaner which is able to recognize an appropriate time of moving the cleaner body electrically, even with no auxiliary sensor structure and a controlling method for the same.

Embodiments of the present disclosure also provide a cleaner which is able to enhance a reaction rate for the user's movement or intention and a controlling method for the same.

Embodiments of the present disclosure also provide a cleaner which is able to enhance a reaction rate in initial movement and moving direction change of a cleaner body and a controlling method for the same.

Technical Solution

To achieve these objects and other advantages and in accordance with the purpose of the embodiments, as embodied and broadly described herein, a cleaner comprises a cleaner body; a handle provided in the cleaner body; a wheel provided in a lower portion of the cleaner body and rotatably supporting the cleaner body; a motor driving the wheel electrically; an encoder sensing the rotation number of the wheel or the motor; and a controller controlling the driving of the motor by varying the voltage applied to the motor based on the rotation number sensed by the encoder, wherein the controller electrically drives the wheel by applying voltage to the motor when the velocity of the cleaner body initially moving is a preset value or more.

The wheel and the motor may be manually rotatable even when no voltage is applied to the motor.

The controller may control the voltage applied to the motor to rise as the rotation number of the wheel or motor reaches the preset value and rises. The increasing force requiring the user to apply may be effectively reduced.

The preset value may be approximately 10 mm/sec. The preset value may be variable in consideration of the load of the floor. For example, in case the load of the floor is large such as a carpeted floor (in case the friction of the floor is large), the preset value may be controlled to be relatively low. In case the load of the floor is small such as wood floor (in case the friction of the floor is small), the preset value may be controlled to be relatively high.

The controller may consistently apply voltage to the motor even when the moving velocity of the cleaner body falls down from the preset value again after rising to the preset value or more. That is because the force the user applies to the cleaner might be strong even when the moving velocity of the cleaner body after the initial movement is lower than the preset value and because the direction of the force the user applies could be changed. It is preferred that the electrical driving of the wheels is consistently performed, to as to preemptively respond the size of the force and the change of the direction. The electrical driving of the wheels may be performed in the direction for reducing the required user's force.

The controller may control the rotation direction of the motor to be converted when the moving direction of the cleaner is converted. The controller may consistently apply voltage to the motor when the cleaner body is temporarily stopped for backward movement after forward movement. The controller may control the rotation direction of the motor to be converted in a period before and after the point of the time when the cleaner body is temporarily stopped for the backward movement after the forward movement. In such the cases, the electrical driving of the wheels may be performed in the direction for reducing the required user's force.

The size of the voltage applied to the motor may be calculated in proportion to the moving velocity of the cleaner body. As the size of the required force is larger, the size of the force the user actually applies has to be preemptively reduced.

The size of the voltage applied to the motor may be calculated to be variable according to the acceleration of the cleaner body. The factor of the moving acceleration may be the factor for preemptively response to the sudden change of the force strength and the sudden direction change of the force.

The voltage may be consistently applied to the motor, until the moving velocity and acceleration of the cleaner body reach 'zero' in case the voltage is applied to the motor after the initial movement of the cleaner body.

Two wheels may be provided in right and left sides of the cleaner body, respectively, and motors are provided in the wheels, respectively, and the motors may be controlled independently. Accordingly, the user's efforts for moving the cleaner body forward and backward and turning right and left can be reduced.

In another aspect of the present disclosure, a controlling method for a cleaner comprises initially moving a cleaner body by rotating a wheel rotatably supporting the cleaner body; determining whether the moving velocity of the cleaner body reaches a preset value after the initial movement of the cleaner body; and electrically moving the cleaner body by applying voltage to a motor electrically driving the wheel when the moving velocity of the cleaner reaches the preset value.

The size of the voltage applied to the motor may get larger as the moving velocity of the cleaner body rises, in the step of electrically moving the cleaner body.

The size of the voltage applied to the motor until the cleaner body may be stopped is proportional to the moving velocity of the cleaner body, in the step of electrically moving the cleaner body.

Voltage may be consistently applied to the motor before both the velocity and the acceleration of the cleaner body reach 'zero', in the step of electrically moving the cleaner body.

Voltage may be consistently applied to the motor even in a state where the cleaner body is temporarily stopped when the velocity of the cleaner body is 'zero' with the acceleration not 'zero', in the step of electrically moving the cleaner body.

The cleaner may comprise wheels provided in both sides of the cleaner body, respectively; and motors provided in the wheels, respectively, and each of the motors may be controlled independently in the step of electrically moving the cleaner body.

The motor may be controlled to be driven in the reverse direction, just before the cleaner body electrically moving is stopped with the moving velocity falling down.

The size of the voltage applied to the motor may be kept uniform by becoming increased again after increased and decreased, when the moving velocity of the cleaner body is kept at a constant value after rising and falling down.

Advantageous Effects

The embodiments have following advantageous effects. It may be estimated whether the user is moving the cleaner by measuring the rotation number of the encoder used in controlling the motor without auxiliary sensors, so as to assist the user's movement and the user can use less force in moving the cleaner.

Furthermore, the cleaner may respond to the encoder phase generation simultaneously and the user's recognition of the cleaner resistance may be lowered when the user pushes and pulls the cleaner.

Still further, the cleaner may assist the user's manipulation for moving the cleaner body, considering the acceleration of the cleaner body and then the reaction velocity for the user's moving of the cleaner can be enhanced. Accordingly, the user may move the cleaner more smoothly.

DESCRIPTION OF SPECIFIC EMBODIMENTS

Referring to the accompanying drawings, exemplary embodiments of the present disclosure according to one embodiment of the present disclosure will be described in detail.

Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 1:
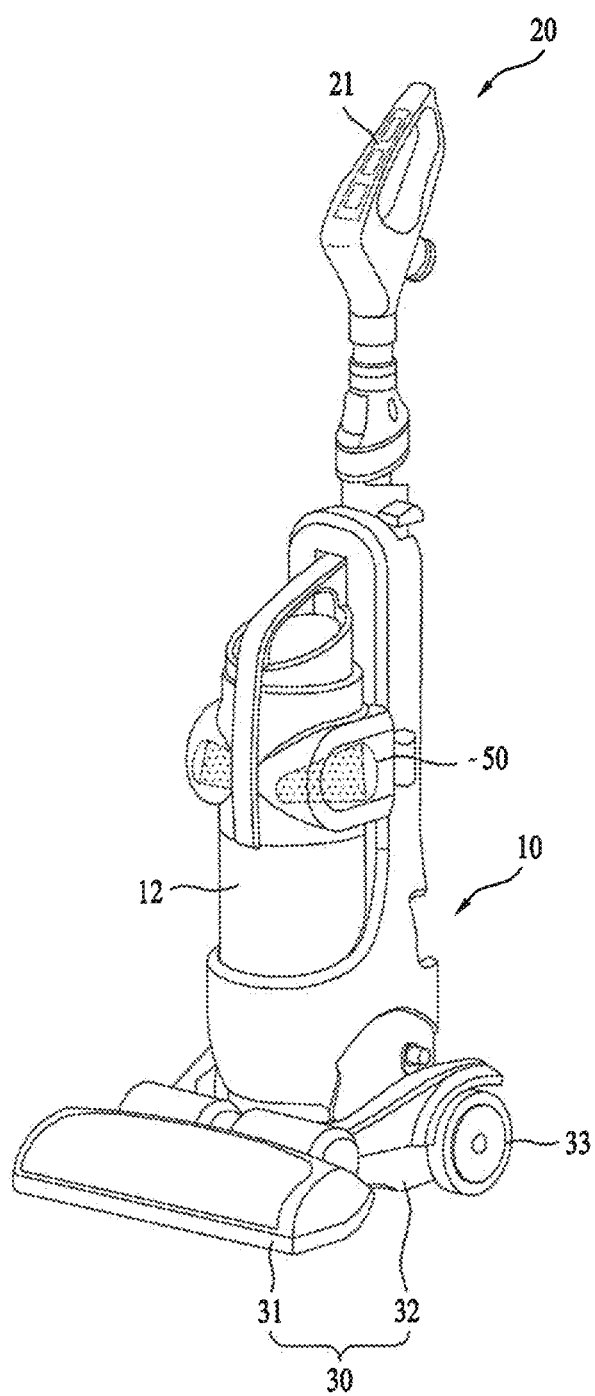
FIG. 1 is a diagram illustrating one example of a cleaner to which embodiments of the present disclosure are applicable.

FIG. 1 is a diagram illustrating one example of a cleaner to which embodiments of the present disclosure are applicable. Especially, FIG. 1 illustrates one example of an up-right cleaner.

Referring to FIG. 1, the cleaner shown in FIG. 1 includes a cleaner body 10 in which a dust collecting case 12 collecting dust and foreign substances on a cleaning object surface is mounted; a suction nozzle 30 provided in a lower portion of the cleaner body to suck dust and foreign substances on the cleaning object surface and seat the case 10 thereon; and a handle 20 provided in an upper portion of the cleaner body 10 and able to be held by the user to perform cleaning.

One or more wheels 33 may be provided in the cleaner body 10 and movably support the cleaner body 10. The wheels 33 may be provided in both sides of the cleaner body 10, respectively, and facilitate linear forward and backward movement and rightward and leftward direction change of the cleaner body 10.

The cleaner body 10 is disposed on and rotatably coupled to the suction nozzle 30 to vary an arrangement angle with respect to the cleaning object surface. The user may support the cleaner case 10 to keep a state of being rotated toward the cleaning object surface during the overall cleaning process.

The dust collecting case 12 is detachably mounted in a front surface of the cleaner case 10. The dust collecting case 12 includes a dust separation member 50 for separating or filtering dust and foreign substances from the air sucked into the cleaner case 10 by a cyclone principle.

In other words, the air sucked into the cleaner case 10 via the suction nozzle 30 is supplied to the dust collecting case 12. The dust and foreign matters contained in the air supplied to the dust collecting case 12 are filtered by the dust separation member 50 and then collected in the dust collecting case 12 after the filtering. The clean air having the dust and foreign substances separated there from is exhausted outside the cleaner body 10.

The dust collecting case 12 is detachably mounted to the cleaner body 10 and the user is able to detach the dust collecting case 12 from the cleaner body 10 and process the dust and foreign substances collected in the dust collecting case 12.

Meanwhile, the dust collecting case 12 shown in FIG. 1 has a cylindrical shape and the shape of the dust collecting case 12 may be diversified, not limited thereto. For example, the dust collecting case 12 may have a polygonal pillar shape such as a rectangular pillar shape.

The suction nozzle 30 may include a nozzle portion 31 sucking dust and foreign substances scattered on the cleaning object surface, together with air; and a mounting portion 32 where the cleaner body 10 is mounted.

The nozzle portion 31 may move in a back and forth direction and right and left directions (in other words, vertically and horizontally or all directions) with respect to the cleaning object surface so as to suck the dust and foreign substances scattered on the cleaning object surface, when the user performs the cleaning.

The mounting portion 32 may be connected with the nozzle portion 31 and a pair of wheels 33 may be rotatably provided in both sides of the mounting portion 32 to which the cleaner body 10 is mounted.

In other words, when the nozzle portion 31 is moving along the cleaning object surface, the mounting portion 32 connected to the nozzle portion 31 is also moving and the wheels 33 are rotated to facilitate the movement of the suction nozzle 30 along the cleaning object surface.

Meanwhile, the handle 20 is provided in an upper portion of the cleaner body 10. When performing the cleaning, the user may hold the handle 20 and support the cleaner body 10 so that the cleaner body 10 can support a rotated state. The user may perform the cleaning process while pushing or pulling the cleaner body 10 by using the handle 20.

A manipulation panel 21 is provided in a front portion of the handle 20 and the user is able to manipulate an operation state of the vacuum cleaner by pressing one or more buttons provided in the manipulation panel 21.

Figure 2:
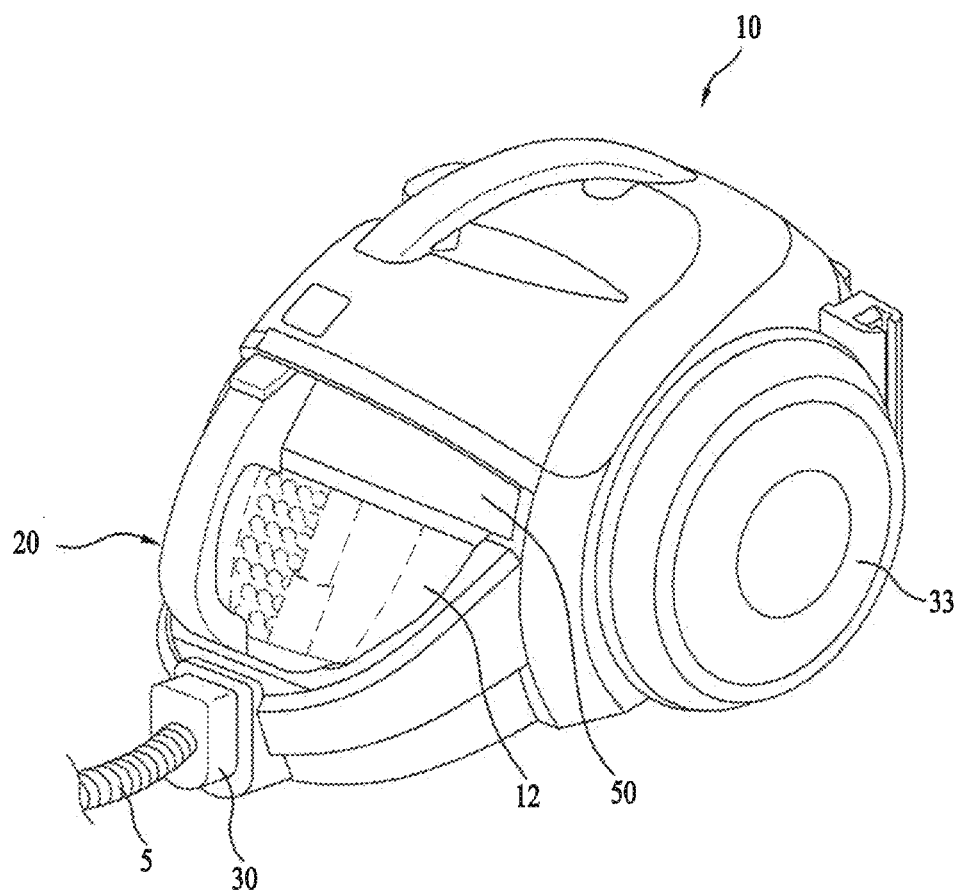
FIG. 2 is a diagram illustrating another example of the cleaner to which embodiments of the present disclosure are applicable.

FIG. 2 is a diagram illustrating another example of the cleaner to which embodiments of the present disclosure are applicable. Especially, FIG. 2 illustrates a cleaner body of a canister cleaner as the example.

As shown in FIG. 2, the illustrated example of the cleaner includes a cleaner body 10; a suction unit 30 in which a connection pipe 5 connected to a suction nozzle (not shown) is provided in a front portion of the cleaner body 10; and one or more wheels 33 provided in both sides of the cleaner body 10 to facilitate the movement of the cleaner body 10.

A cover member 40 may, be provided in an upper portion of the cleaner body 10 and protect internal components.

A dust collecting mechanism is provided in the front portion of the cleaner body 10 to collect dust and other foreign substances. The dust collecting mechanism is made of a transparent material for the user to see the collected dust and other foreign substances outside.

The dust collecting mechanism includes a dust collecting case 12 in which dust and foreign substances are collected. A dust separation member 50 is provided in the cleaner body 10 and separates dust from the collected substances.

The handle for moving the suction nozzle may be provided in an upper end of the suction nozzle in the cleaner shown in FIG. 2. The user grasps the handle in the hand and moves the suction nozzle, so that the cleaner body connected with the suction nozzle can move toward the suction nozzle.

The examples of the present disclosure mentioned above are applicable to both of the up-right and canister cleaners. However, the latter example is more proper for the up-right cleaner. Considering the movement of the cleaner body when the cleaning is performed, more intention has to be consistently paid to the movement of the cleaner body has to be more important than those of the other parts. In other words, the cleaner body of the up-right cleaner performs back and forth movement and right and left movement consistently. In contrast, the cleaner body of the canister cleaner performs forward movement periodically during the cleaning process.

According to the embodiment of the present disclosure, the cleaner drives the wheels electrically, in other words, the cleaner body is electrically-powered or driven. The driving of the wheels may include both of the clockwise and counter-clockwise direction movements and that example is more appropriate for the up-right cleaner.

Hereinafter, the control configuration and control flow according to one embodiment of the present disclosure will be described in detail. It will be more clearly understood that such control configuration and control flow is more applicable to the up-right cleaner.

Figure 3:
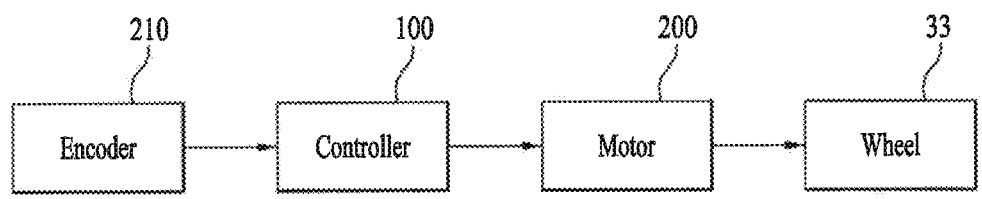
FIG. 3 is a control block diagram of a cleaner in accordance with one embodiment of the present disclosure.

FIG. 3 is a control block diagram of a cleaner in accordance with one embodiment of the present disclosure.

Referring to FIG. 3, the cleaner in accordance with one embodiment of the present disclosure includes a motor 200 connected to the wheels 33 to provide a rotational three and rotary together with the wheels 33 when the wheels 33 are rotated. In other words, when the motor 200 is electrically driven, the wheels 33 are rotated so that the cleaner body of the cleaner may be electrically movable.

When the wheels 33 are rotated, the motor 200 is rotatable by the rotation of the wheels 33. In other words, the motor 200 may not be positively driven by the electrical power but manually driven by the manual rotation of the wheels. Such the manual rotation of the motor 200 may not need the voltages applied thereto, different from the electrically-driven rotation.

The motor 200 may also provide the rotational driving force for rotating the wheels 33. In other words, the motor 200 may positively rotate the wheels 33. When a voltage is applied to the motor 200, the wheels 33 may be electrically rotated by the electrical driving of the motor.

According to the illustrated example, the cleaner may include an encoder 210 sensing a rotation number of the motor 200. The rotation number means the rotation velocity and rotation direction. The encoder 210 may sense the rotation number of the wheels 33 and the moving velocity and direction of the cleaner body may be figured out based on the rotation number of the motor or the wheels directly sensed by the encoder 210.

More specifically, the encoder 210 may figure out the movement direction and velocity such as the presence of the cleaner body forward movement, backward movement, left turning or right turning.

The encoder 210 is configured as a component used in controlling the driving of the wheels or motor and measures the amount and direction of the wheel rotation so as to estimate presence of the user's moving or the user's intention. Such estimation may be performed based on the rotation number and a velocity gradient (acceleration) sensed by the encoder 210, so that it can be positively recognized whether the velocity and acceleration is changed by the user's manipulation or by the load of the floor.

The encoder 210 may be attached to the motor 200 and a shaft of the motor 200 is inserted in the encoder 210 so that the encoder 210 can detect the rotation number of the motor. The encoder 210 detects the rotation number of the motor 210 and transmits RPM (Revolution per Minutes) of the motor currently operating to a controller 100 controlling the motor 200. In this instance, the encoder 210 may transmit information about whether the rotation of the motor is a clockwise direction or a counter-clockwise direction.

The information about the rotation number sensed by the encoder 210 may be transmitted to the controller 100 and the controller 100 may calculate the velocity of the moving cleaner 10 based on the information about the rotation number. As the wheel 33 is circular-shaped, the moving velocity of the cleaner body 10 is gained by multiplying the rotation number by a diameter.

The controller 100 may calculate the moving acceleration of the cleaner body 10 based on the information about the rotation number sensed by the encoder 210. As the encoder 210 is able to sense the variation of the rotation number according to the time, the controller 100 is able to calculate the moving acceleration of the cleaner body 10 by multiplying the rotation number by a diameter.

The controller 100 may control the motor 200 based on the information about the rotation number measured by the encoder 210. In other words, the controller 100 may control the movement of the cleaner body. The controller 100 may control the rotation number of the motor, using feed-back.

In this instance, the control of the rotation number of the motor may be variable control. The rotation velocity and direction of the motor is not controlled to be constant and uniform but to be variable according to circumstances. For example, the rotation number of the motor is controlled to rise in a specific case and to fall in another specific case.

Such the rotation number of the motor may be variable according to the voltage applied to the motor. As the voltage applied to the motor is getting higher, the rotation number of the motor is controlled to get higher. In contrast, as the rotation number of the motor is getting higher, the voltage applied to the motor gets higher.

Meanwhile, the wheels 33 may be provided in right and left sides of the cleaner body 10, respectively. The motors 200 may be also provided in the right and left wheels 33, respectively. In other words, a motor for driving the right wheel and the other motor for driving the left wheel may be provided.

When the two motors are rotating in the clockwise direction at the same RPM, it may be determined that the cleaner body is moving forward linearly. When the two motors are rotating in the counter-clockwise direction at the same RPM, it may be determined that the cleaner body 10 is moving backward. When the two motors are rotating in the clockwise direction at different RPMs, it may be determined that the cleaner body is turning left or right.

In the illustrated example, the movement of the cleaner body may be positively controlled regardless of the moving direction of the cleaner body. In other words, the moving direction and number of the cleaner body may be positively controlled according to the user's location or intention.

Figure 4:
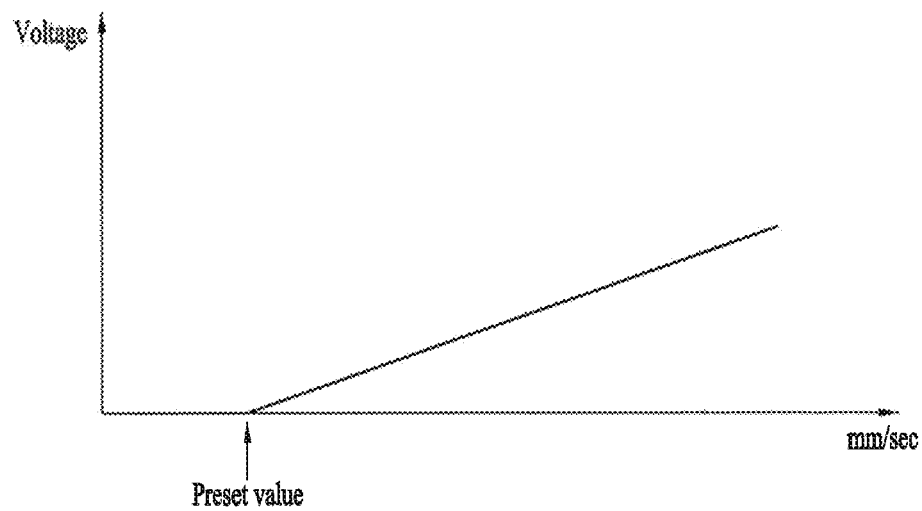
FIG. 4 is a graph illustrating interrelation between voltage and speed and interrelation between speed and time.
Figure 4:
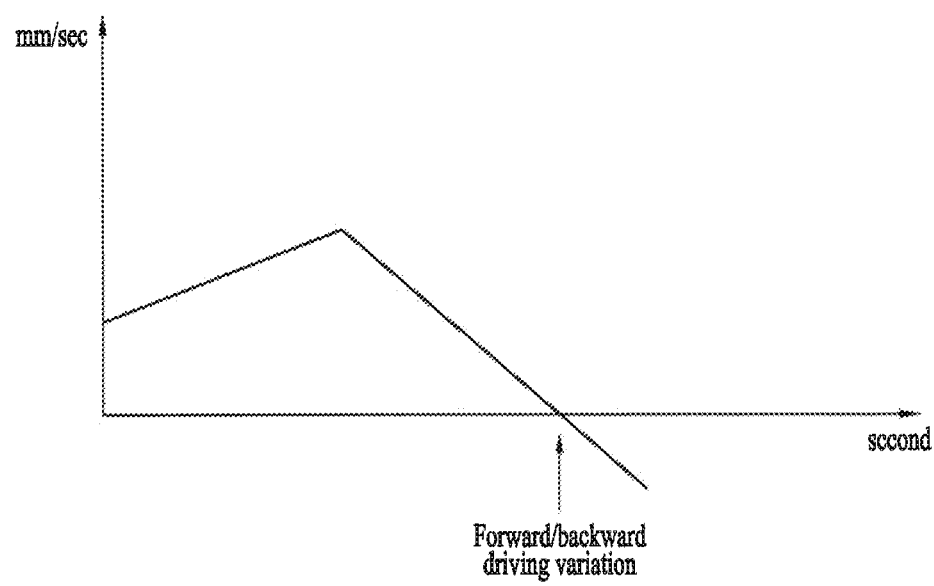

Hereinafter, referring to FIG. 4, the control of the wheel driving in accordance with one embodiment of the present disclosure will be described in detail.

FIG. 4(a) is a relation graph between voltage and velocity in accordance with one embodiment of the present disclosure. Specifically, FIG. 4(a) illustrates the time point at which the controller 100 applies voltage to the motor 200.

FIG. 4(b) is a relation graph between velocity variation and movement direction.

As shown in FIG. 4(a), the controller 100 may drive the motor 200 and the wheels electrically by applying voltage to the motor 200 when the velocity of the cleaner body 10 is a preset value or more. When the cleaner body 10 stands still or the moving velocity of the cleaner body 10 is a preset value or less, the controller 100 may not apply voltage to the motor 200. In other words, the driving time point of the motor may be determined by the moving velocity of the cleaner body 10.

In case of the up-right cleaner, the user is able to push or pull the cleaner body by using the handle. Accordingly, the preset value can be set as the minimum velocity at which the cleaning is performed. For example, the motor may not be driven electrically in the movement of the cleaner body when the user intends to perform cleaning with holding the handle of the cleaner.

In case of the up-right cleaner, the user is able to tilt the cleaner backward to a preset angle with holding the handle. At this time, the wheels may be rotated and it is preferred that the wheels are not driven electrically, because it means that the user is not prepared for moving the up-right cleaner to perform cleaning.

The preset value of the cleaner body may be set as approximately 10 mm/sec. the preset value may be more or less than 10 mm/sec and variable according to other factors such as the load of the floor and the use pattern. For example, a carpet as the cleaning surface mainly where the user mainly use the cleaner has a higher resistance value than a common food floor. If the floor load is large, the preset value may be set as to be relatively small. When the floor load is small, the preset value may be set to be relatively large.

If a relatively small force is applied to the cleaner body, the cleaner is able to move on the hard wood floor. Even with a force strong enough to tilt the up-right cleaner, the user may move the up-right cleaner forward.

Accordingly, when it is determined that the cleaner body 10 is moved at a smaller value than the preset value, using the encoder 210, it is preferred that the wheels 33 are not electrically driven by the motor 200. If the motor 200 is driven, which the user does not intend to, the cleaner body 10 is likely to move in an unintended direction and the user could feel inconvenient.

For example, the user could feel embarrassed if the up-right cleaner is electrically moved forward only by the user's simple tilt. Even worse, the user might lose the handle and the handle of the cleaner might fall down to the ground.

In the illustrated embodiment, when the velocity of the cleaner body 10 reaches the preset value, voltage may be applied to the motor 200. Preferably, voltage is applied to the motor 200 at the moment when the moving velocity of the cleaner body 10 reaches the preset value and the wheels are electrically driven.

After the velocity of the cleaner body 10 is higher than the preset value, the voltage applied to the motor 200 may get larger according as the velocity of the cleaner body 10. It is preferred that the applied voltage becomes higher in proportion to the velocity of the cleaner body 10.

When the velocity of the cleaner body 10 gets higher by the user's manipulation, it is analyzed that the user intends to move the cleaner body 10 rapidly. It means that the user's force applied to the cleaner body 10 becomes stronger as the velocity of the cleaner body 10 becomes higher. Accordingly, the increase of the required force applied to the cleaner body 10 by the user may be minimized by heightening the voltage applied to the motor more as the velocity of the cleaner body 10 gets higher.

The higher is the velocity of the cleaner body 10, the more voltages are applied to the motor 200 to heighten RPM of the motor 200. In the illustrated embodiment, the applied voltages are increased in proportion to the rotation number of the motor by the feed-back of the encoder 210 for the rotation direction and number of the motor 200. Of course, the time when the voltages are applied to the motor may be the time when the moving velocity of the cleaner body reaches the preset value.

As shown in FIG. 4(b), the encoder 210 is able to measure the point of the time when the velocity of the cleaner body 10 is changed from positive to negative. The time when the velocity of the cleaner body 10 is changed from positive to negative the same as the time when the rotation of the wheels 33 are changed from clockwise to counter-clockwise is equal to the time. That case may mean the state where the user intends to pull the cleaner body 10 after pushing to locate it close.

When the user pushes the cleaner body 10 forward, the moving velocity of the cleaner body gets heighted and then lowered. As the user pushes the cleaner body by stretching the arm with the body standing still, the movement of the cleaner body 10 is stopped one moment. Hence, as the user pulls the cleaner body again, the moving velocity of the cleaner body gets heightened and then lowered and the cleaner body finally stands.

The repeated forward and backward movement of the cleaner body is typical to the up-right cleaner. In other words, the moving and stopping and forward and backward direction change of the cleaner body may be typical in the up-right cleaner.

The point of the time when the voltage starts to be applied to the motor may be determined as the point of the time when the cleaner is initially moved. In other words, it is preferred that voltage is applied to the motor, when the moving velocity reaches the preset value after the cleaner starts to move for the cleaning.

The point of the time when the voltage applying is stopped is also important as well as the point of the time when the voltage applying starts. The cleaner body has to stop moving in a state of stretching the arm so that the cleaner body may be likely to move farther.

However, in the embodiment of the present disclosure, the point of the time for starting the voltage applying may be not determined only based on the moving velocity of the cleaner, different from the point of the time for stopping the voltage applying. The point of the time for stopping the voltage applying may be determining, considering the factor of cleaner acceleration, which will be described later.

For example, the velocity of the cleaner temporarily gradually gets lowered after moving forward and the cleaner temporarily stops. Then, the cleaner moves backward after temporarily stopping. The velocity of the cleaner may be lower than the preset value for a preset shot time period after and before temporarily stopping. However, voltages may be consistently applied to the motor even in the period of time.

The point of the time for stopping the voltage applying to the motor may be the point of the time when the cleaner stands consistently not the point of the time when the cleaner stops temporarily. In other words, the voltage applying stops at the moment when both the moving velocity and the moving acceleration are 'zero'.

In brief, when moving the cleaner forward in a state of standing still (when moving the cleaner initially), the velocity of the cleaner body 10 moving forward increases and reaches the preset value and then voltage starts to be applied to the motor to move the cleaner body forward. Even when the cleaner stops temporarily after the velocity of the cleaner moving forward gets heightened and lowered, the voltages may be applied to the motor continuously. In this instance, the phase of the voltages applied to the motor may be variable. That is, the voltage for driving the wheels clockwise may be applied and then the voltage for driving the wheels counter-clockwise may be applied.

Such the control pattern may be applicable even when the cleaner is pulled and moved backward by the user.

As mentioned above, each of the wheels may be controlled by the corresponding motor independently. For example, it may be determined that the cleaner body is turned left, when the right wheel is rotated with the left wheel standing or the rotation number of the right wheel is higher than that of the left wheel. Even in this case, it may be determined based on the preset value when voltage is applied to the motors or the voltage applying is stopped.

According to the embodiments of the present disclosure, the user is able to manipulate the movement of the cleaner easily and conveniently so as to move the cleaner case forward, backward, forward after turning left, backward after turning left, forward after turning right, backward after turning right. The user is able to move the cleaner with a relatively small force and use the cleaner conveniently. Especially, the present disclosure may provide the high capacity cleaner even with the heavy cleaner body the user is able to use conveniently.

The controller 100 may change the rotation direction of the motor 200 from positive to negative, after the velocity of the cleaner body 10 passes the value where the velocity is changed from positive to negative. In other words, the controller 100 applies reversed voltage to the motor 200 and then changes the rotation direction of the motor 200.

Figure 5:
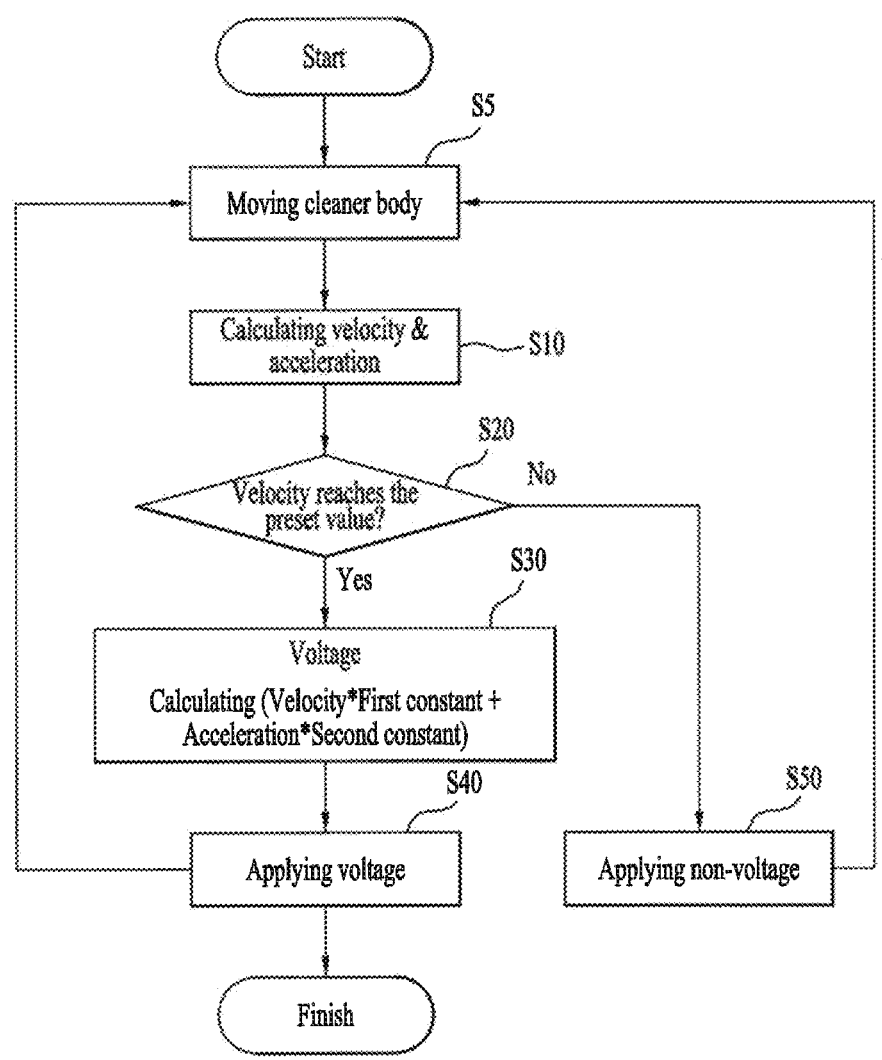
FIG. 5 is a flow chart illustrating steps of a controlling method in accordance with one embodiment of the present disclosure.

FIG. 5 is a flow chart illustrating steps of a controlling method in accordance with one embodiment of the present disclosure.

Referring to FIG. 5, the cleaner body 10 provided in the cleaner is moved according to the user's manipulation (S5). When the cleaner body 10 starts to move (S5), it may be determined whether the movement of the cleaner body 10 is the initial driving. In other words, it may be determined whether the cleaner body 10 is initially moved. It may be determined whether the cleaner body 10 moves after completely stopping movement not after temporarily stopping.

The difference between the temporary stopping and the complete stopping may be figured out based on the moving velocity of the cleaner body and the rotation number and acceleration of the wheels. For example, it may be determined that the cleaner is completely stopped when the rotation number and the acceleration reaches 'zero' at an internal of 1 second. It may be determined that the cleaner is temporarily stopped when the rotation number is 'zero' and the acceleration is not 'zero'.

Once the movement of the cleaner body is determined as the initial movement, the encoder 210 may sense the rotation number of the motor 200. The rotation number of the motor 200 may be equal to or in proportion to that of the wheels 33.

The controller 100 may convert the rotation number sensed by the encoder 210 into the velocity of the cleaner body 10 and calculate the velocity of the cleaner body 10 based on the converted velocity (S10).

Hence, the controller 100 determines whether the velocity of the cleaner body 10 reaches the preset value (S20) and applies the voltage for driving the motor electrically. The controller 100 may calculate the voltage which will be applied to the motor (S30).

In the step of determining whether the velocity of the cleaner body 10 reaches the preset value, it is determined only whether the velocity of the initial movement reaches the preset value Once the velocity of the initial movement reaches the preset value, voltage is applied. The voltage is applied consistently only if the velocity of the movement becomes lower than the preset value.

The applied voltage may be determined to be proportional to the moving velocity of the cleaner body. It is controlled that the more voltages are applied as the moving velocity of the cleaner body gets higher. Accordingly, the voltage applied to the motor 200 may be calculated by multiplying a first constant by the moving velocity of the cleaner body.

Voltage may be initially applied to the motor 200 after determining that the cleaner body is initially moved.

The calculated voltage is applied to the motor (S40) and the process of calculating or sensing the velocity (S10), calculating the voltage which will be applied to the motor (S30) and applying the calculated voltage (S40) may be repeatedly performed. It is preferred that the step (S20) is performed during such the repeated performance of the processes and the step (S20) is to determine whether the velocity of the cleaner body reaches the preset value. When the moving velocity lowered after heightened according as the voltage is applied reaches or lower than the preset value, no more voltage is applied to the motor.

The cleaner body repeatedly performs the forward and backward movement and the step (S10) of calculating the velocity may figure out the moving direction of the cleaner body. More specifically, the overall moving condition of the cleaner body may be figured out by figuring out the rotation number and direction of each of the two motors. The voltage applying step (S40) may distinguish the voltage applying for driving the motor clockwise from the voltage applying for driving the motor counterclockwise direction.

In the step of calculating the voltage which will be applied to the motor (S30), the calculated voltage may be 'zero'. In this instance, the voltage applying step (S40) may a voltage of 'zero' to the motor and it means that the voltage applying is stopped.

At the point of the time when the step of calculating the velocity and acceleration (S10) gains 'zero' as the calculated values for both the velocity and the acceleration after the voltage applying starts, the voltage applying is controlled to stop. In other words, it is determined that the cleaner is stopped completely and the voltage applying may be stopped.

When the velocity of the initial movement reaches the preset value or more, the voltage applying is performed. Even when the moving velocity is the preset value or less, the voltage applying is continuously performed. However, when the moving velocity gets lower and reaches '0' with the acceleration reaching '0', that is, when the cleaner is completely stopped not temporarily stopped, the voltage applying is stopped.

In conclusion, the time of stating the voltage applying may be determined only based on the factor of the moving velocity and the time of stopping the voltage applying may be determined by the factors of the moving velocity and the acceleration.

The size of the voltage applied to the motor may be determined in consideration of the moving acceleration as well as the moving velocity of the cleaner body. In other words, the factors for determining the size of the applied voltage may include not only the moving velocity but also the acceleration.

The velocity variation may form a line or gentle curve. A graph showing the velocity variation may be similar to a graph showing the applied voltage. The applied voltage is determined to be proportional to the moving velocity, viewed in an overall framework.

However, the variation of the moving velocity only is capable of showing the overall moving pattern of the cleaner body and not capable of expecting sudden change of the movement of the cleaner body. In other words, the user could suddenly push or pull the cleaner body with a stronger force. The size and direction of the force the user applies to the cleaner body 10 may be drastically changed.

When the acceleration of the cleaner body 10 is large, it means that the user's force applied to the cleaner body is drastically changed in a moment. The need to reduce the force the user applies to the cleaner body may be increasing. In the circumstance, the controller 100 may change the voltage applied to the motor 200. Specifically, the applied voltage may be changed in consideration adding a factor of acceleration to the factor of the moving velocity, only to heighten the reaction rate in the initial driving and direction change of the cleaner body as the time when the user's force is drastically changed. In other words, the user's force applied in the initial driving and direction change may be reduced more and preemptively corresponded.

The step of calculating the voltage which will be applied to the motor (S30) may calculate the voltage, considering both the factor of the velocity and the factor of the acceleration of the cleaner body. For example, the voltage may be determined as the sum of a value gained by multiplying a first constant by the moving velocity and a value gained by multiplying a second constant by the moving acceleration.

In the illustrated embodiment, the velocity of the cleaner body 10 may be given more weight than the acceleration and it is preferred that the first constant is larger than the second constant. The momentary force the user applies is calculated from the acceleration and the overall force the user applies to move the cleaner body 10 is calculated from the velocity of the cleaner body 10, so that the movement of the cleaner body 10 may be assisted by using the velocity rather than the acceleration.

For example, the first constant is 0.6 and the second constant is 0.005. It is possible to vary the first constant and the second constant, considering the weight and floor resistance of the cleaner body 10.

When the voltage value is calculated, a corresponding voltage is applied to the motor 200 and the motor generates a rotational force to rotate the wheels 33 (S40).

In contrast, when the velocity of the initial movement of the cleaner body 10 is smaller than the preset value, no voltage is applied to the motor (S50). The cleaner body 10 may be moved only by the user's force, without assisting the user's manipulation. Such the state means the state where the user initially moves the cleaner body 10 or stops the movement of the cleaner body 10. If the user's force is assisted in such the state, the user depends on the driving of the motor 200 and the assistance of the motor 200 is not preferred.

Certain reaction might be generated by the wrong manipulation even if the user does not intend to move the cleaner body 10. If the cleaner body 10 is moved by the motor 200 even in that state, the user might feel uncomfortable.

Figure 6:
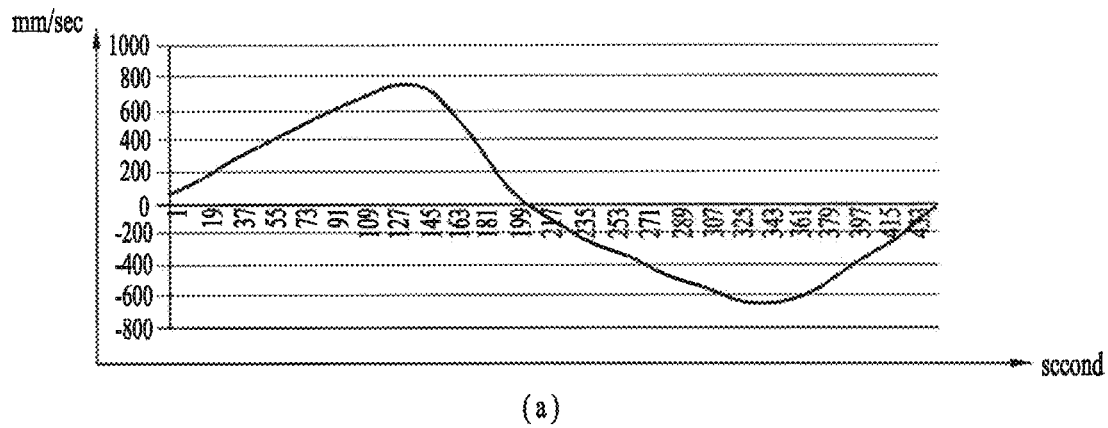
FIG. 6 is a graph illustrating speed, acceleration and voltage when the cleaner in accordance with one embodiment is moving back and force repeatedly.
Figure 6:
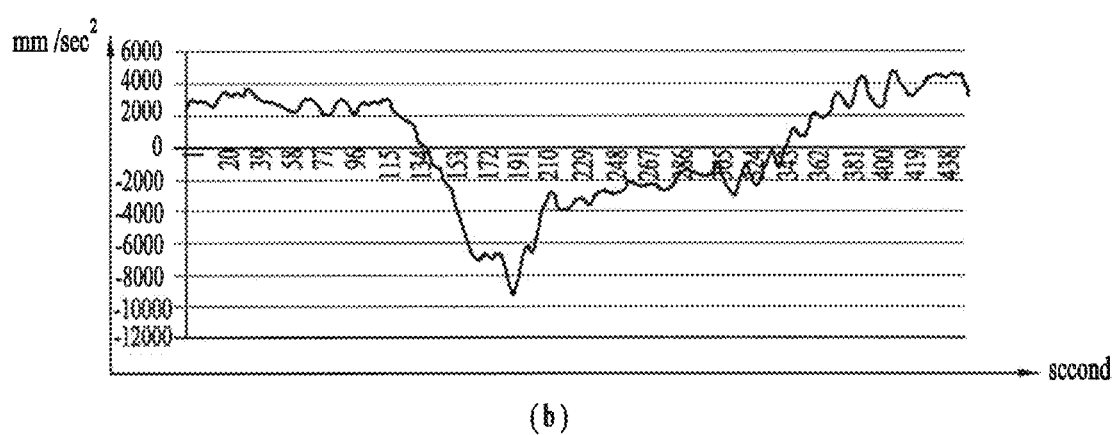
Figure 6:
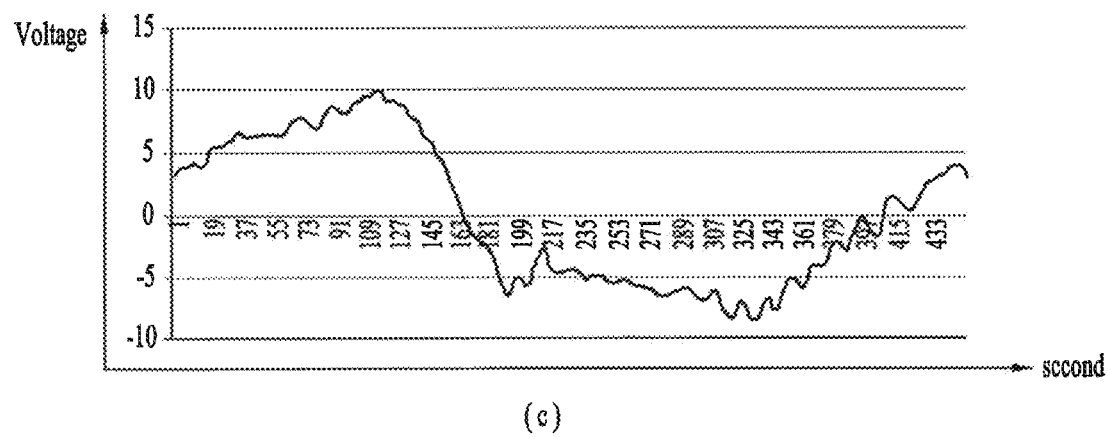
Figure 7:
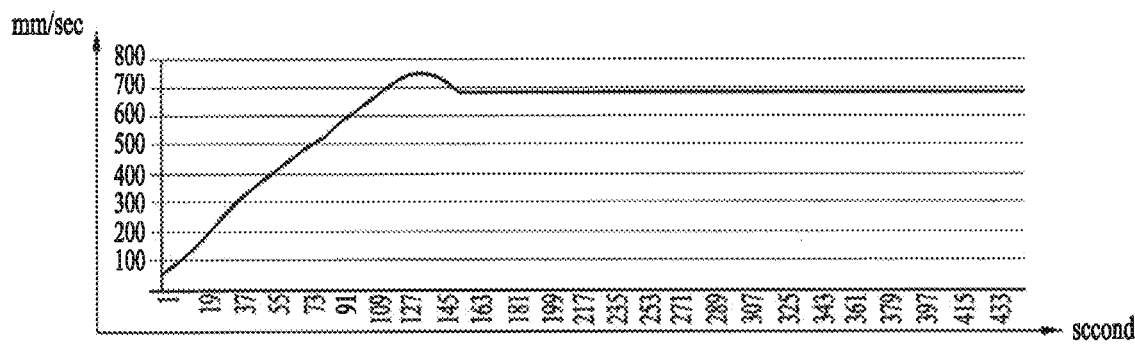
FIG. 7 is a graph illustrating speed, acceleration and voltage when the cleaner in accordance with one embodiment is moving forward linearly.
Figure 7:
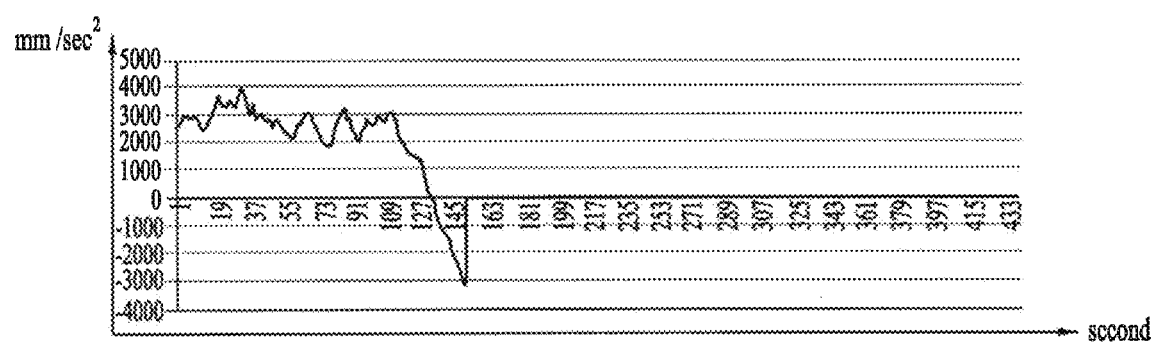
Figure 7:
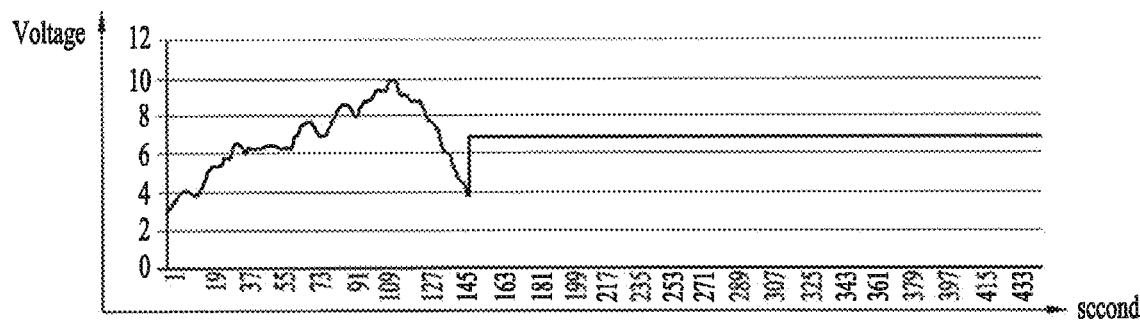

FIG. 6 illustrates a graph of velocity, acceleration and voltage when the cleaner in accordance with the present disclosure repeatedly performs the forward and backward movement. FIG. 7 illustrates a graph of velocity, acceleration and voltage when the cleaner consistently performs the forward movement.

Specifically, FIG. 6(a) and FIG. 7(a) shows a velocity rate, FIG. 6(b) and FIG. 6(c) shows acceleration variation. FIG. 6(c) and FIG. 7(c) show variation of the applied voltage.

Once the cleaner body 10 starts to move forward, the velocity of the cleaner body 10 rises with the lapse of time. The acceleration of the cleaner body 10 may be varied by the unevenness of the floor and the like even when the velocity of the cleaner body 10 rises. The acceleration may be a positive value, because the velocity of the cleaner body 10 gets higher. The velocity of the cleaner body 10 rises and then falls down to 'zero' finally. In other words, the cleaner stops after all so as to move backward after forward. Even when the user intends to move the cleaner body 10 backward, the cleaner body 10 is not moved backward in a moment but there is the pattern of the velocity of the forward movement falling down to 'zero' and the velocity of the backward movement starting to rise after that.

When the cleaner body is moved forward with the velocity gradually falling down, the acceleration of the cleaner body 10 is a negative value.

The voltage calculated in the forward movement of the cleaner body is a positive value and the positive value of voltage is applied to the motor, only to assist the user's manipulation.

When the cleaner body is moved backward, the acceleration of the cleaner body 10 is a negative value. When the velocity of the cleaner body 10 is a positive value even in case the acceleration is a negative value, the voltage applied to the motor 200 may be a positive value or a negative value. As mentioned above, the value of voltage is the sum of the values gained by multiplying the two constants by the velocity and the acceleration of the cleaner body 10.

As shown in FIG. 6, when the cleaner body is temporarily stopped, that is, the moving velocity is 'zero', the acceleration is a negative value and even a voltage phase is a negative value. In other words, the motor is driven not in the direction in which the wheels are rotated and moved forward but in the direction in which the wheels are rotated and moved backward. Accordingly, the user may temporarily stop the cleaner body with a small force and then move it backward with a small force.

The reaction velocity may be enhanced in preemptive response to the initial driving or the direction changing by considering the factor of the acceleration. In other words, the driving of the motor may be preemptively controlled at the point of the time when the size and direction of the force applied to the cleaner body is drastically changed.

FIG. 7 illustrates a state where the cleaner body 10 accelerated and moved forward starts to be moved forward at a constant velocity. FIG. 7a shows velocity and FIG. 7b shows acceleration. FIG. 7c shows voltage.

Not only the cleaning movement pattern shown in FIG. 6 but also the cleaning movement pattern shown in FIG. 7 (the constant velocity movement) may be generated.

When the user moves the cleaner body 10 at a constant velocity, the acceleration of the cleaner body 10 is 'zero' and the part of the voltage under the influence of the acceleration is 'zero', The voltage applied to the motor 200 is according to the velocity of the cleaner body 10 and the voltage is the value gained by multiplying the first constant by the velocity of the cleaner body 10, so that the voltage may be proportional to the velocity of the cleaner body 10.

Even in this instance, voltage is consistently applied to drive the motor and then the user is able to move the cleaner more smoothly and conveniently.

When the rising moving velocity of the cleaner starts to fall down, the applied voltage has a relatively larger amount of falling. Accordingly, the moving velocity may preemptively falls down according to the user's intention.

As mentioned above, the embodiments of the present disclosure may provide the cleaner which is capable of minimizing the user's efforts, with the cleaning pattern of the repeated forward and backward movement and the cleaning pattern of the linear forward movement.

Furthermore, the embodiments of the present disclosure may provide the cleaner having no sensor components which are required so sensing the user's location, the distance between the user and the cleaner body and the distance between the handle and the cleaner body. Accordingly, the embodiments of the present disclosure may provide the economical cleaner with the simple structure and the low production cost.

INDUSTRIAL APPLICABILITY

Industrial applicability of the present disclosure is disclosed in the description of the specific embodiments.

What is claimed is:
1. A cleaner comprising:
a cleaner body;
a wheel that is connected with the cleaner body and that is located in a lower portion of the cleaner body, the wheel being configured to rotatably support the cleaner body;

a handle that is located on the cleaner body and that is configured to allow a user to hold the handle to move the cleaner body by rotating the wheel;

a motor that is connected with the wheel and that is configured to drive the wheel electrically;

an encoder that is connected with at least one of the wheel or the motor and that is configured to sense a rotation number of the wheel or the motor; and a controller that is located on the cleaner body and that is configured to drive the motor by varying a voltage applied to the motor based on the rotation number sensed by the encoder, wherein the controller is configured to electrically drive the wheel by:

determining a velocity of the cleaner body, determining that the velocity of the cleaner body is equal to or more than a preset value, and initiating application of voltage to the motor based on the determination that the velocity of the cleaner body is equal to or more than the preset value, wherein the controller is configured to, after the initiation of application of voltage to the motor, determine that the velocity of the cleaner body falls below the preset value and, based on the determination that the velocity of the cleaner body falls below the preset value, consistently apply voltage to the motor to change a moving direction of the cleaner body, wherein the voltage applied to the motor is determined as a sum of a first value determined by multiplying a first constant and the velocity of the cleaner body and a second value determined by multiplying a second constant and a moving acceleration of the cleaner body, and wherein the first constant is larger than the second constant.

2. The cleaner as claimed in claim 1, wherein the wheel and the motor are manually rotatable even when no voltage is applied to the motor.

3. The cleaner as claimed in claim 1, wherein the controller controls the voltage applied to the motor to rise as the rotation number of the wheel or motor reaches the preset value and rises.

4. The cleaner as claimed in claim 1, wherein the preset value is approximately 10 mm/sec.

5. The cleaner as claimed in claim 1, wherein the controller controls a rotation direction of the motor to be converted when the moving direction of the cleaner is converted.

6. The cleaner as claimed in claim 1, wherein the controller consistently applies voltage to the motor when the cleaner body is temporarily stopped for backward movement after forward movement.

7. The cleaner as claimed in claim 1, wherein the controller controls a rotation direction of the motor to be converted in a period before and after a point of time when the cleaner body is temporarily stopped for a backward movement after a forward movement.

8. The cleaner as claimed in claim 1, wherein an amplitude of the voltage applied to the motor is calculated in proportion to the velocity of the cleaner body.

9. The cleaner as claimed in claim 8, wherein the amplitude of the voltage applied to the motor is calculated to be variable according to an acceleration of the cleaner body.

10. The cleaner as claimed in claim 9, wherein the voltage is consistently applied to the motor, until the velocity and acceleration of the cleaner body reach 'zero' in case the voltage is applied to the motor after initial movement of the cleaner body.

11. The cleaner as claimed in claim 1, wherein two wheels are provided in right and left sides of the cleaner body, respectively, and motors are provided in the wheels, respectively, and the motors are controlled independently.

12. A controlling method for a cleaner comprising:

moving, based on force applied by a user holding a handle of the cleaner, a cleaner body of the cleaner by rotating a wheel that is connected with the cleaner body and that is located in a lower portion of the cleaner body, the wheel being configured to rotatably support the cleaner body;

determining a velocity of the cleaner body;

determining that the velocity of the cleaner body is equal to or more than a preset value;

based on the determination that the velocity of the cleaner body is equal to or more than the preset value, electrically driving the wheel by initiating application of voltage to a motor; and after the initiation of application of voltage to the motor, determining that the velocity of the cleaner body falls below the preset value; and based on the determination that the velocity of the cleaner body falls below the preset value, consistently applying voltage to the motor to change a moving direction of the cleaner body, wherein the voltage applied to the motor is determined as a sum of a first value determined by multiplying a first constant and the velocity of the cleaner body and a second value determined by multiplying a second constant and a moving acceleration of the cleaner body, and wherein the first constant is larger than the second constant.

13. The controlling method for the cleaner as claimed in claim 12, wherein an amplitude of the voltage applied to the motor gets larger as the velocity of the cleaner body rises, in the step of electrically moving the cleaner body.

14. The controlling method for the cleaner as claimed in claim 12, wherein an amplitude of the voltage applied to the motor until the cleaner body is stopped is proportional to the velocity of the cleaner body, in the step of electrically moving the cleaner body.

15. The controlling method for the cleaner as claimed in claim 12, wherein voltage is consistently applied to the motor before both the velocity and acceleration of the cleaner body reach 'zero', in the step of electrically moving the cleaner body.

16. The controlling method for the cleaner as claimed in claim 12, wherein voltage is consistently applied to the motor even in a state where the cleaner body is temporarily stopped when the velocity of the cleaner body is 'zero' with acceleration not 'zero', in the step of electrically moving the cleaner body.

17. The controlling method for the cleaner as claimed in claim 12, wherein:

the cleaner comprises wheels provided in both sides of the cleaner body, respectively; and motors provided in the wheels, respectively, and each of the motors is controlled independently in the step of electrically moving the cleaner body.

18. The controlling method for the cleaner as claimed in claim 12, wherein the motor is controlled to be driven in a reverse direction, just before the cleaner body electrically moving is stopped with the velocity falling down.

19. The controlling method for the cleaner as claimed in claim 12, wherein an amplitude of the voltage applied to the motor is kept uniform by becoming increased again after increased and decreased, when the velocity of the cleaner body is kept at a constant value after rising and falling down.

* * * * *